Patented Feb. 16, 1932

1,845,158

UNITED STATES PATENT OFFICE

RUDOLPH KRECH, OF MANNHEIM, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

PRODUCTION OF COLORED RUBBER GOODS

No Drawing. Application filed September 3, 1927, Serial No. 217,528, and in Germany September 4, 1926.

The production of clear violet, blue and green dyeings on rubber has hitherto been difficult. The basic and acid dyestuffs of the triarylmethane series and the anthraquinone series, which on account of their brilliancy particularly come into question here, are inapplicable because both the soluble dyestuffs and the lakes produced from them are destroyed in the vulcanizing operation.

I have now found that triarylmethane dyestuffs having a sulfo-group in ortho-position to the methane carbon atom, and sulfonic acids or carboxylic acids of anthraquinone derivatives having at least one free or substituted amino-group constitute exceptions to the general inapplicability of dyestuffs of these kinds, because their insoluble metal salts (lakes), which may if desired be formed on a suitable substratum, produce dyeings on rubber which are fast to vulcanization.

The following examples will further illustrate how this invention may be carried out in practice, though it is understood that the invention is not limited thereto. The parts are by weight.

Example 1

85 parts of a rubber mixture containing in 100 parts 60 parts of crude rubber, 1.7 parts of sulfur, 0.6 part of an accelerator, 25 parts of lithopone and 12.7 parts of chalk, are mixed in a roller mixing machine, while warm, with 15 parts of a color lake obtained as follows: 1016 ccs. of a neutral suspension of aluminium hydroxide of 2 per cent strength are mixed with a solution of 20 grams of patent blue A (Schultz, Farbstofftabellen, 6th edition, 1923, No. 545, color index 714) in 40 ccs. of water. 300 ccs. of a solution of barium chlorid of 10 per cent strength are added and the precipitate is filtered off by suction, washed and dried. A hollow body formed from this colored mixture is vulcanized in the usual manner in the iron mould by application of steam at 3 atmospheres pressure for 70 minutes. The vulcanized product is greenish blue.

Example 2

A rubber mixture as basis containing in 100 parts 74 parts of light colored crude rubber, 2.5 parts of sulfur, 2.2 parts of an accelerator, 13 parts of zinc white and 8.3 parts of lithopone, is mixed with a color lake prepared as described in Example 1, the proportion being 85 parts of the mixture to 15 parts of the lake; the mixture is worked up on the hot mixing rollers. The thin rolled sheet embedded in talc and treated with steam at 3 atmospheres pressure for 70 minutes yields a blue vulcanized sheet.

What I claim is:

1. The process of producing vulcanized colored rubber goods, which comprises incorporating with the rubber prior to vulcanization an insoluble barium salt of patent blue A and then vulcanizing the rubber.

2. As new articles of manufacture vulcanized colored rubber goods obtainable by incorporating with the rubber prior to vulcanization an insolule barium salt of patent blue A, and then vulcanizing.

3. The process of producing vulcanized colored rubber goods, which comprises incorporating with the rubber prior to vulcanization, an insoluble metal salt of an acid dyestuff of the triarylmethane dyestuff series having a sulfo group in ortho-position to the methane carbon atom, and then vulcanizing the rubber.

4. As new articles of manufacture vulcanized colored rubber goods comprising an insoluble metal salt of an acid dyestuff of the triarylmethane dyestuff series having a sulfo group in ortho-position to the methane carbon atom, and then vulcanizing.

5. As new articles of manufacture blue vulcanized rubber goods comprising rubber, a water-insoluble metal salt of patent blue A and a finely divided filler.

6. As new articles of manufacture blue vlucanized rubber goods comprising rubber, from 8 to 10 per cent its weight of a water-insoluble barium salt of patent blue A and from 44 to 83 per cent of a filler.

7. As new articles of manufacture blue vulcanized rubber goods comprising rubber, from 8 to 10 per cent its weight of a water-insoluble barium salt of patent blue A and from 44 to 83 per cent of a finely divided colourless filler.

In testimony whereof I have hereunto set my hand.

RUDOLPH KRECH.